United States Patent
Gottipati et al.

(10) Patent No.: US 12,411,705 B2
(45) Date of Patent: Sep. 9, 2025

(54) SYSTEM AND METHOD FOR CONTEXT-AWARE APPLICATION MANAGEMENT IN CONTAINER DEPLOYMENT ENVIRONMENTS

(71) Applicant: Druva Inc., Sunnyvale, CA (US)

(72) Inventors: Srikiran Gottipati, Vijayawada (IN); Preethi Srinivasan, Sunnyvale, CA (US); Nishith Chitaliya, Amravati (IN); Stephen Manley, Livermore, CA (US)

(73) Assignee: Druva Inc., Santa Clara, CA (US)

( * ) Notice: Subject to any disclaimer, the term of this patent is extended or adjusted under 35 U.S.C. 154(b) by 621 days.

(21) Appl. No.: 17/833,451

(22) Filed: Jun. 6, 2022

(65) Prior Publication Data
US 2023/0259384 A1    Aug. 17, 2023

(30) Foreign Application Priority Data
Feb. 16, 2022  (IN) .............................. 202241008247

(51) Int. Cl.
G06F 9/455    (2018.01)
(52) U.S. Cl.
CPC ...... G06F 9/45558 (2013.01); G06F 9/45533 (2013.01); *G06F 2009/45587* (2013.01)
(58) Field of Classification Search
CPC ............ G06F 9/45558; G06F 9/45533; G06F 2009/45587
See application file for complete search history.

(56) References Cited

U.S. PATENT DOCUMENTS

| | | | | |
|---|---|---|---|---|
| 2001/0002473 A1* | 5/2001 | Waldo | ..................... | H04L 67/02 709/227 |
| 2001/0012775 A1* | 8/2001 | Modzelesky | ......... | H04W 12/06 455/430 |
| 2003/0131151 A1* | 7/2003 | Roach | .................. | H04Q 3/0045 719/318 |
| 2003/0187956 A1* | 10/2003 | Belt | ...................... | H04L 67/535 709/219 |
| 2004/0117804 A1* | 6/2004 | Scahill | ..................... | G06F 9/542 719/320 |
| 2005/0278259 A1* | 12/2005 | Gunaseelan | ........... | G06Q 10/10 705/59 |
| 2009/0183250 A1* | 7/2009 | Harada | ................... | G06F 21/10 726/9 |
| 2009/0187575 A1* | 7/2009 | DaCosta | ................ | G06Q 30/06 |

(Continued)

*Primary Examiner* — Tuan C Dao
(74) *Attorney, Agent, or Firm* — IceMiller LLP (57) ABSTRACT

A system for context-aware application group management in a container deployment environment is presented. The system includes a memory storing one or more processor-executable routines and a processor. The processor is configured to execute the one or more processor-executable routines to receive an instance identifier (ID) corresponding to an application group based on a re-registration request for the application group by the user; identify an instance corresponding to the instance ID from an instance database and a context based on the instance from a context database; generate a re-registration token comprising a context ID corresponding to the context, and initiate a re-registration workflow to create a new instance of the application group based on the re-registration token and the context ID. A related method is also presented.

14 Claims, 4 Drawing Sheets

(56) References Cited

U.S. PATENT DOCUMENTS

| | | | |
|---|---|---|---|
| 2010/0098074 A1* | 4/2010 | Kokernak | H04N 7/17318 |
| | | | 725/32 |
| 2012/0041844 A1* | 2/2012 | Shen | G06Q 30/06 |
| | | | 705/26.61 |
| 2012/0072910 A1* | 3/2012 | Martin | G06F 9/45533 |
| | | | 718/1 |
| 2012/0131146 A1* | 5/2012 | Choi | H04L 65/61 |
| | | | 709/219 |
| 2012/0240112 A1* | 9/2012 | Nishiguchi | G06F 9/45558 |
| | | | 718/1 |
| 2012/0278844 A1* | 11/2012 | Curtis | H04N 21/47202 |
| | | | 725/93 |
| 2013/0132696 A1* | 5/2013 | Tomida | B60K 6/485 |
| | | | 711/E12.002 |
| 2013/0152180 A1* | 6/2013 | Nair | G06F 21/575 |
| | | | 726/26 |
| 2014/0355508 A1* | 12/2014 | Anchan | H04W 4/08 |
| | | | 370/312 |
| 2015/0052145 A1* | 2/2015 | Choi | G06F 16/951 |
| | | | 707/740 |
| 2016/0055014 A1* | 2/2016 | Gallimore | G06F 8/64 |
| | | | 719/320 |
| 2016/0366233 A1* | 12/2016 | Le | H04L 67/51 |
| 2018/0020062 A1* | 1/2018 | Li | H04W 4/70 |
| 2021/0377341 A1* | 12/2021 | Huang | A63F 13/355 |
| 2023/0336371 A1* | 10/2023 | De | H04L 61/5069 |

\* cited by examiner

```
struct ReregistrationToken {
    ApplicationContextID string
    OrgID string
    AccountID string
}
```

FIG. 3

```
struct ApplicationToken {
    ApplicationInstanceID string
    ApplicationContextID string
    OrgID string
    AccountID string
}
```

SYSTEM AND METHOD FOR CONTEXT-AWARE APPLICATION MANAGEMENT IN CONTAINER DEPLOYMENT ENVIRONMENTS

CROSS-REFERENCE TO RELATED APPLICATION

This application claims a benefit of, and priority to, India Provisional Patent Application No. 202241008247, filed Feb. 16, 2022, the contents of which is incorporated by reference in its entirety.

BACKGROUND

Embodiments of the present invention generally relate to application management in container deployment environments, and more particularly to context aware application management in a Kubernetes environment.

An application running within a Kubernetes environment consists of native Kubernetes resources (e.g., service accounts, stateful sets, persistent volumes, secrets, etc.), potentially custom resources that are defined specifically for that application, and external storage made available in the cluster via persistent volumes. These resources are backed up and stored to be retrieved when needed as part of data protection strategy. However, identifying ownership, history, lineage of the application and data can be challenging because snapshotting or data backups do not inherently capture the ownership information. Moreover, backups are typically stored outside the cluster and the ownership properties of the application are lost as backups are stored outside the Kubernetes cluster.

When context information is lost, the application protection merely comes down to just storing copies. This approach is ineffective as it does not support the increasingly growing multiple admins/stakeholders' scenarios that organizations are facing today when it comes to application protection. Therefore, heavy lifting needs to be done by backup and cloud admin in retrieving and bringing back the applications. Moreover, there is lack of availability of history or information on the evolution of the application for cross-cluster retrieval, cloning, distribution, migration, disaster recovery, compliance, etc., because lineage cannot be tracked. Further, authorization to the application comes at the discretion of a cloud admin without any prior knowledge or information about the ownership of the application. Furthermore, if an application is deleted or de-registered, there is currently no way to know that the same application is the one that is retrieved later, thus losing the context of the application. All these nuances are not available as part of native Kubernetes orchestration or as a Kubernetes protection vendor solution.

Thus, there is a need for systems and methods that provide for context-aware application management in container deployment environments, e.g., Kubernetes.

SUMMARY

The following summary is illustrative only and is not intended to be in any way limiting. In addition to the illustrative aspects, example embodiments, and features described, further aspects, example embodiments, and features will become apparent by reference to the drawings and the following detailed description.

Briefly, according to an example embodiment, a system for context-aware application group management in a container deployment environment is presented. The system includes a memory storing one or more processor-executable routines and a processor. The processor is configured to execute the one or more processor-executable routines to receive an instance identifier (ID) corresponding to an application group based on a re-registration request for the application group by the user; identify an instance corresponding to the instance ID from an instance database and a context based on the instance from a context database; generate a re-registration token comprising a context ID corresponding to the context, and initiate a re-registration workflow to create a new instance of the application group based on the re-registration token and the context ID.

According to another example embodiment, a method for context-aware application group management in a container deployment environment is presented. The method includes receiving an instance identifier (ID) corresponding to an application group based on a re-registration request for the application group by the user; identifying an instance corresponding to the instance ID from an instance database, and a context-based on the instance from a context database; generating a re-registration token comprising a context ID corresponding to the context, and initiating a re-registration workflow to create a new instance of the application group based on the re-registration token and the context ID.

BRIEF DESCRIPTION OF THE FIGURES

These and other features, aspects, and advantages of the example embodiments will become better understood when the following detailed description is read with reference to the accompanying drawings in which like characters represent like parts throughout the drawings, wherein.

DETAILED DESCRIPTION OF EXAMPLE EMBODIMENTS

Various example embodiments will now be described more fully with reference to the accompanying drawings in which only some example embodiments are shown. Specific structural and functional details disclosed herein are merely representative for purposes of describing example embodiments. Example embodiments, however, may be embodied in many alternate forms and should not be construed as limited to only the example embodiments set forth herein. On the contrary, example embodiments are to cover all modifications, equivalents, and alternatives thereof.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figures. It should also be noted that in some alternative implementations, the functions/acts/steps noted may occur out of the order noted in the figures. For example, two figures shown in succession may, in fact, be executed substantially concurrently or may sometimes be executed in the reverse order, depending upon the functionality/acts involved.

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or a section. Thus, a first element, component, region, layer, or section discussed below could be termed a second element, component, region, layer, or section without departing from the scope of example embodiments.

Spatial and functional relationships between elements (for example, between modules) are described using various terms, including "connected," "engaged," "interfaced," and "coupled." Unless explicitly described as being "direct," when a relationship between first and second elements is described in the description below, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular example embodiments only and is not intended to be limiting. Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless specifically stated otherwise, or as is apparent from the description, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

Example embodiments of the present description provide systems and methods for context-aware application group management in a container deployment environment. Non-limiting examples of container deployment environments include Docker Swarm, Kubernetes, Openshift, Hashicorp, Rancher, Mesos, cloud container environments in AWS, Azure, Google Cloud, and the like. For the purpose of this description, the following embodiments are described with respect to a Kubernetes-based container deployment environment. However, it must be understood that embodiments described herein can be implemented in any container deployment environment.

The term "application group" as used herein refers to an application definition running within a Kubernetes environment. The application group running on a Kubernetes cluster consists of a set of Kubernetes resources created at installation time or post-installation runtime. The resources created at installation may include native Kubernetes resources (e.g., service accounts, stateful sets, persistent volume, secrets, and the like), and potentially custom resources that are defined specifically for a particular application.

In some embodiments, the application groups may be cluster-scoped or namespace-scoped. In some other embodiments, the application group may be defined based on reference graphs. In some embodiments, the application group may be defined using the systems and methods described in U.S. patent application Ser. No. 17/590,966, titled "System and method for automatically identifying application groups in container deployment environments" or U.S. patent application Ser. No. 17/591,236, titled "System and method for reference-aware application identification in container deployment environments", incorporated by reference in their entirety unless directly contradictory to the embodiments described herein.

Non-limiting examples of use cases where the systems and methods of the present description can be employed include backup and recovery, cross-cluster retrieval, deletion (including accidental deletion/de-registration), cloning, distribution, migration, disaster recovery, compliance, governance, etc.

Figure 1:
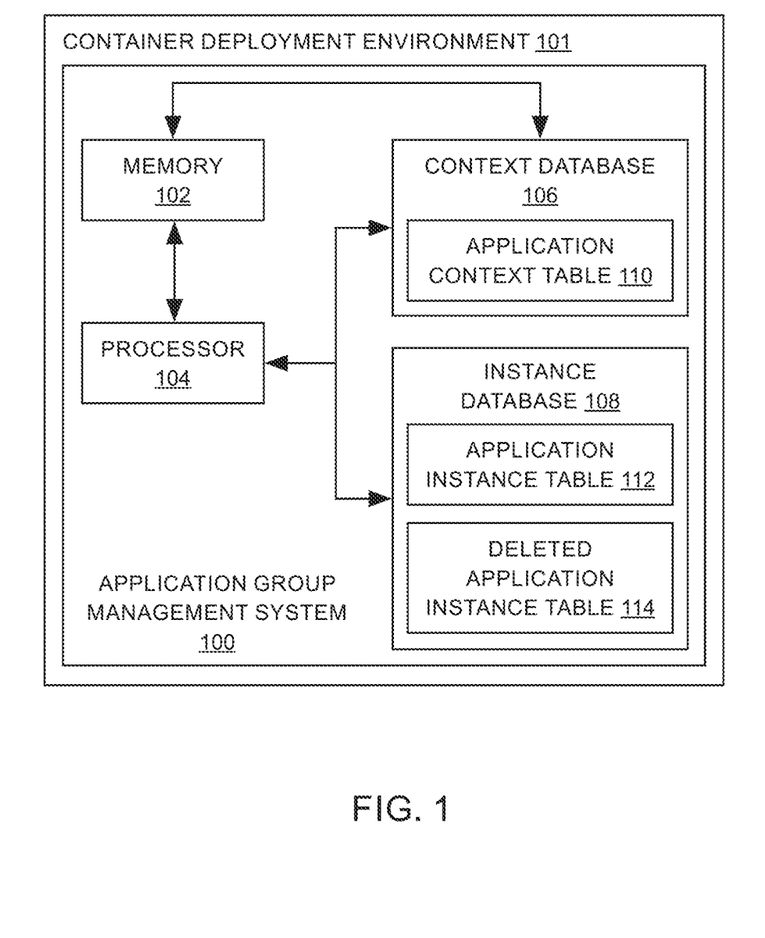
FIG. 1 illustrates an example system for context-aware application group management in a container deployment environment, according to some aspects of the present description.

FIG. 1 illustrates an example system 100 for context-aware application group management in a container deployment environment 101. The system 100 includes a memory 102 storing one or more processor-executable routines and a processor 104 communicatively coupled to the memory 102. The system may further include a context database 106 and an instance database 108. In the example illustrated in FIG. 1, the context database 106 and the instance database 108 are co-located with the processor 104 in the container deployment environment 101. In some other embodiments, the context database 106 and the instance database 108 may be located within the memory 102. The context database 106 includes an application context table 110 and the instance database 108 includes an application instance table 112 and a deleted application instance table 114. Each of these components is described in detail below.

As noted earlier, the systems and methods described herein provide for identification of the instances of the same application group and correlating it to the same context. This is implemented using identifiers used to track context: instance ID and context ID. Identifiers are created during registration, may be encrypted as a component in tokens generated for each workflow (registration of cluster and application, recovery, etc.), may be stored in persistent storage (e.g., cloud, on-premise), and verified during recreation/recovery. Identifiers are part of the data model to generate tokens. These identifiers are encrypted in the token. The following description provides the details of context ID and instance ID.

The term "context ID" as used herein refers to a unique ID per cluster and per application group. When a cluster/application group is registered for protection, it is assigned a unique context identifier called the application's context ID. A context database entry may be inserted into an application context table 110 in the context database 108 to capture all the information related to that application group. Non-limiting examples of information captured and stored when an application group context is created (either when an application group is first registered or an existing application group context is cloned) include context ID generated upon context creation, user info of the user that created the context, creation time of the context, parent context ID when a context is cloned, or combinations thereof.

The term "instance ID" as used herein refers to a unique ID per registered cluster and per registered application group. When an application group is registered for protection, it is assigned a unique instance identifier called the application's instance ID. An instance database entry may be inserted into an application instance table 112 to capture the information related to that application group. Non-limiting examples of information that may be captured and stored as part of the application instance entry may include: instance ID created upon instance creation, corresponding context ID of the application, user info of the user that created the instance, creation time of the instance, or combinations thereof.

According to embodiments of the present description, backups of a registered application group are indexed by the context ID of the application group. When a registered group application is de-registered, the corresponding context database entry is left untouched in the application context table 110 while the corresponding instance database entry is deleted from the application instance table 112 and added to the deleted application instance table 114. Thus, when an application context does not have a corresponding instance, the context can be claimed by another user by re-registering the application with the previously assigned context ID and acquiring a new instance ID. Further, all the instances in the deleted application instance table 114 that correspond to a specific context ID provide a historical view of all registrations and de-registrations (including the user info that initiated the action) for that application.

Figure 2:
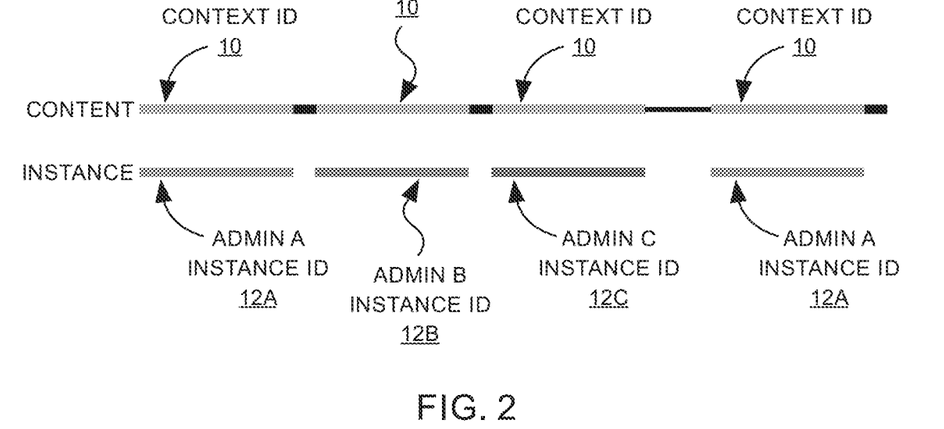
FIG. 2 is an example of context ID and instance ID for the same application, according to some aspects of the present description.

As depicted in FIG. 2, the context ID 10 stays the same for the application group even when de-registered (black segments in the context line). Each application admin creates their instance (for example, 12A, 12B, and 12C) establishing ownership of the instance. Thus, both context (that identifies entity across environment and cluster) and instance (ownership) may be tracked according to embodiments of the present disclosure.

Referring again to FIG. 1, the processor 104 is configured to execute the one or more processor-executable routines to receive an instance ID corresponding to an application group based on a re-registration request for the application group by a user. As described in detail later, the re-registration request may correspond to the registration of an application group that is currently de-registered (as shown in FIG. 2) or may correspond to a cloning request for an application group that is currently registered or de-registered.

The processor 104 is further configured to execute the one or more processor-executable routines to identify an instance corresponding to the instance ID from the instance database 108 and a context based on the instance from the context database 106. The processor 104 may be configured to execute the one or more processor-executable routines to identify an instance corresponding to the instance ID from either the deleted application instance table 114 (for a currently de-registered instance) or from the application instance table 112 (for currently registered instance) in the instance database 106. Further, the processor 104 may be configured to execute the one or more processor-executable routines to identify a context based on the instance from the application context table 110 in the context database 106.

Figure 3:
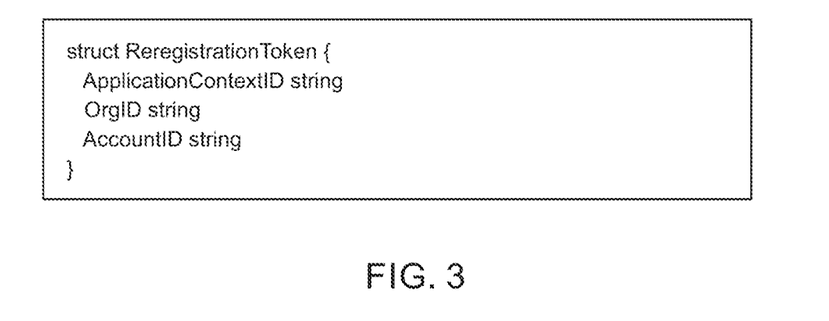
FIG. 3 is an example of an application group token, according to some aspects of the present description.

The processor 104 is further configured to execute the one or more processor-executable routines to generate a re-registration token including a context ID corresponding to the context. A re-registration token is required to re-register an application group for protection and own the historical context of the application (including all backups) before deregistration. The validity of the re-registration token is restricted to the application group for which it was issued. FIG. 3 provides an example of a re-registration token.

In some embodiments, the processor 104 may be further configured to execute the one or more processor-executable routines to verify ownership of the application group based on a userinfo of the user and one or more userinfo corresponding to the context across one or more instances before generating the re-registration token. The processor 104 may be configured to execute the one or more processor-executable routines to match a userinfo of the user requesting re-registration of the application group with a user info corresponding to the context and/or instances based on one or more rules.

Figure 4:
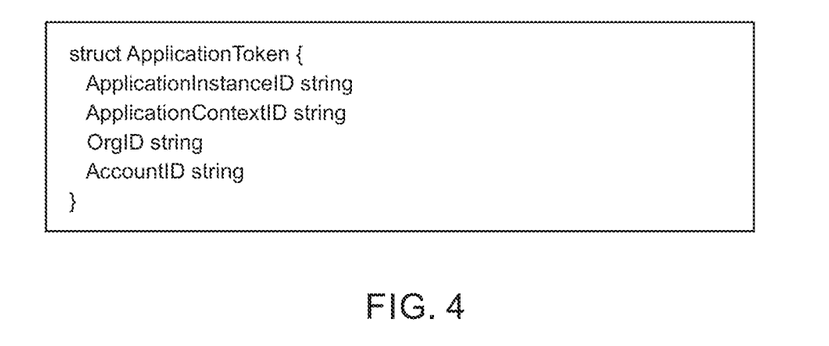
FIG. 4 is an example of a re-registration token, according to some aspects of the present description.

The processor 104 is further configured to execute the one or more processor-executable routines to initiate a re-registration workflow to create a new instance of the application group based on the re-registration token and the context ID. In some embodiments, the processor 104 may be further configured to execute the one or more processor-executable routines to allocate a new instance ID corresponding to the new instance and generate an application group token corresponding to the new instance. An application group token is required to initiate application-related workflows like backup and restore. The validity of the application token is restricted to the application for which it was issued. FIG. 4 provides an example of an application token.

As noted earlier, embodiments of the present description provide for re-registration of currently de-registered application groups as well as for cloning of application groups that are currently registered or de-registered. In one embodiment, the re-registration request corresponds to the re-registration of the application group that is currently de-registered. In such embodiments, the processor is further configured to execute the one or more processor-executable routines to verify that a context with the context ID exists and verify that the context isn't associated with an active instance before generating the re-registration token.

In another embodiment, the re-registration request corresponds to a cloning request for the application group that is currently registered or de-registered. In such embodiments, the processor is further configured to execute the one or more processor-executable routines to allocate a new context ID corresponding to the application group based on the cloning request for the application group by the user and to create a copy of the original context with the new context ID and userinfo corresponding to the new context ID. The processor may be further configured to execute the one or more processor-executable routines to create copies of all original backups of the original context ID and link them with the new context ID. The processor may be furthermore configured to execute the one or more processor-executable routines to create one or more references to one or more resources associated with the original backups or replicate one or more resources associated with the original backups.

Figure 5:
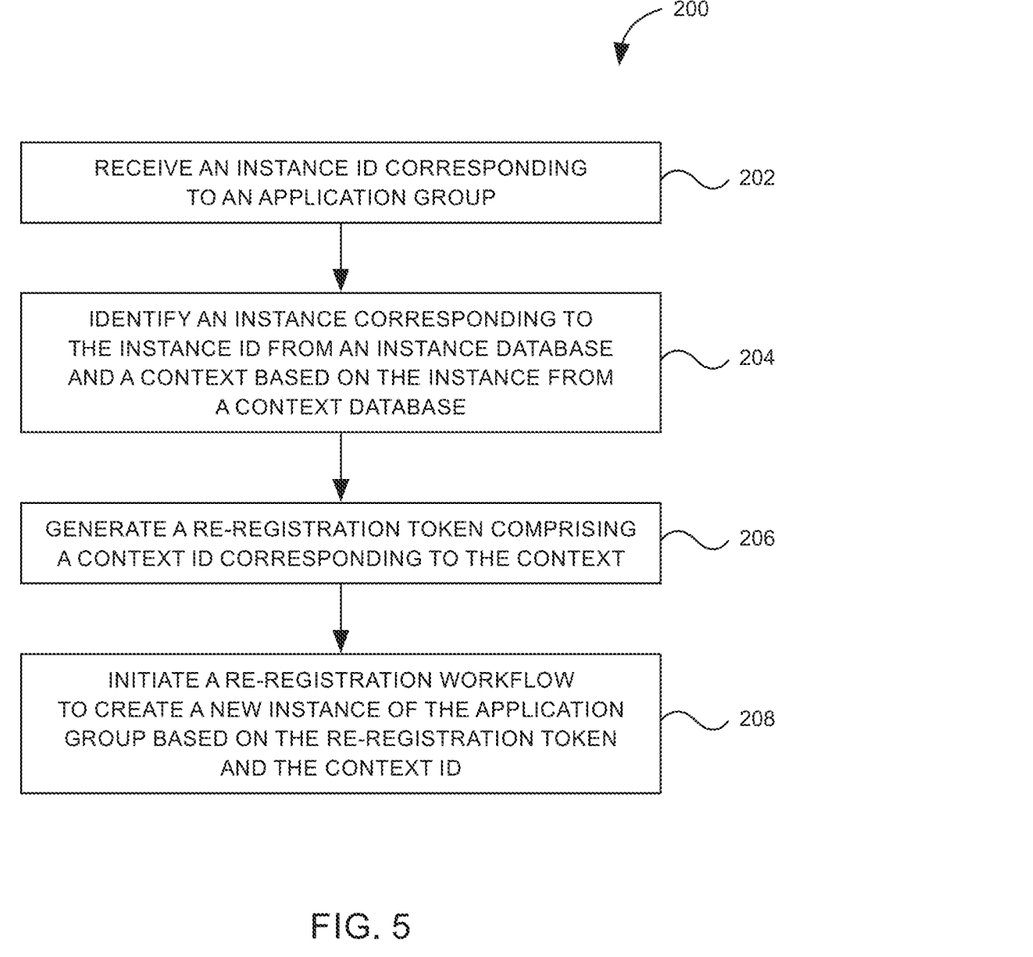
FIG. 5 is a flow chart illustrating an example method for context-aware application group management in a container deployment environment, according to some aspects of the present description.

FIG. 5 is a flowchart illustrating a method 200 for context-aware application group management in a container deployment environment, for example, a Kubernetes environment. The method 200 may be implemented using the system 100 of FIG. 1 according to some aspects of the present description. Each step of the method 200 is described in detail below.

The method 200 includes, at block 202 receiving an instance identifier (ID) corresponding to an application group based on a re-registration request for the application group by the user. The method 200 further includes, at block 204, identifying an instance corresponding to the instance ID from an instance database, and a context based on the instance from a context database. The method furthermore includes, at block 206, generating a re-registration token including a context ID corresponding to the context. The method moreover includes, at block 208, initiating a re-registration workflow to create a new instance of the application group based on the re-registration token and the context ID. The terms "instance ID" and "context ID" have been described herein earlier.

The method 200 may further include verifying ownership of the application group based on a userinfo of the user and one or more userinfo corresponding to the context across one or more instances before generating the re-registration token.

As noted earlier, embodiments of the present description provide for re-registration of currently de-registered application groups as well as for cloning of application groups that are currently registered or de-registered. In one embodiment, the re-registration request corresponds to the re-registration of the application group that is currently de-registered. In such embodiments, the method 200 further includes verifying that a context with the context ID exists and verifying that the context isn't associated with an active instance.

In another embodiment, the re-registration request corresponds to a cloning request for the application group that is currently registered or de-registered. In such embodiments, the method 200 further includes allocating a new context ID corresponding to the application group based on the cloning request for the application group by the user, creating a copy of the original context with the new context ID and userinfo corresponding to the new context ID, and creating copies of all backups of the original context ID and linking them with the new context ID. In some embodiments, the method 200 may further include creating one or more references to one or more resources associated with the original backups or replicating one or more resources associated with the original backups.

Embodiments of the present description are further described herein with reference to workflows used for registration, de-registration, re-registration, and the like. According to embodiments of the present description, a registration workflow for the registration of an application group includes creating an application definition object to define a new application group. The application definition object specifies all the resources that constitute the application group. An application definition creation webhook further captures the user info of the user that created the application definition object. The registration workflow further includes initiating registration of the application group by an application group controller with a catalog service based on the user info of the user that created the application definition object. The catalog service allocates context ID and instance ID for the registered application group and further tracks the relevant context and instance information. An application token is further generated by the catalog service.

According to embodiments of the present description, a de-registration workflow for de-registration of an application group includes requesting de-registration of an application group by deleting an application definition object. Upon receiving a request for de-registering an application group from the application definition controller, the catalog service verifies that the instance ID exists and is active. The catalog service further moves the relevant application group instance into the deleted application instance table.

According to embodiments of the present description, a re-registration workflow for an application group includes requesting a re-registration token for a de-registered application based upon an old instance ID assigned to the application group upon registration in the past.

Upon receiving the re-registration token request, the catalog service identifies the instance with the given instance ID and identifies the context with the context ID tracked by the instance. To establish ownership, the catalog service or an administrator may match (based on rules) the requestor user info with user infos captured with the application context and all its instances across time. The re-registration workflow further includes creating an application definition object to define a new application group. The application definition object may include the complete resource specification for the application or the application definition object may download the specification from the old application definition (after re-registration). The application definition object further specifies the re-registration token containing context ID. The re-registration workflow further includes initiating registration of the application group with the catalog service based on the user info of the user that created the application definition object.

Upon receiving the re-registration request, the catalog service verifies that the re-registration token is valid, extracts the context ID from the re-registration token, verifies that a context with the context ID exists, and further verifies that the context isn't associated with an active instance. After all the request validations are completed, the catalog service allocates a new instance ID, tracks all the information related to the new instance, generates the application token with the relevant information, and returns the instance ID and the application token.

According to embodiments of the present description, a cloning workflow for an application group includes receiving a request for a clone of an application group that could be currently registered or de-registered based on the instance ID of the application that is currently registered or based on the instance ID assigned to the application upon registration in the past. Upon receiving the cloning request, the catalog service identifies the instance with the given instance ID and identifies the context with the context ID tracked by the instance. To establish ownership, the catalog service or an administrator may match (based on rules) the requestor user info with user info captured with the application context and all its instances across time.

After all request validations, the catalog service allocates a new context ID, creates a copy of the original context with the new context ID and user info, and creates copies of all backups of the original context ID and links them with the new context ID. For a thin clone, the catalog service creates references to resources associated with the original backups. And, for a thick clone, the catalog service replicates the resources associated with the original backups. A re-registration workflow may be further initiated to create a new instance of the application.

Thus, the systems and methods described herein generate, preserve, and track the context of the application group across the life and after-life of the application group. Further, the systems and methods described herein generate, preserve, and track the context of the application group across instances of the application group in different environments, clusters, and admins. Moreover, the systems and methods described herein enable the generation of "hard" clones of the application group by copying even the reference to the context of the application group. Furthermore, the systems and methods described herein facilitate authorization to verify ownership or shared/multiple ownership of application groups enabling independence for application group owners with less to no dependency on cloud admins for re-using applications.

The systems and methods described herein may be partially or fully implemented by a special purpose computer system created by configuring a general-purpose computer to execute one or more particular functions embodied in computer programs. The functional blocks and flowchart elements described above serve as software specifications, which may be translated into the computer programs by the routine work of a skilled technician or programmer.

The computer programs include processor-executable instructions that are stored on at least one non-transitory computer-readable medium, such that when run on a computing device, cause the computing device to perform any one of the aforementioned methods. The medium also includes, alone or in combination with the program instructions, data files, data structures, and the like. Non-limiting examples of the non-transitory computer-readable medium include, but are not limited to, rewriteable non-volatile memory devices (including, for example, flash memory devices, erasable programmable read-only memory devices, or a mask read-only memory devices), volatile memory devices (including, for example, static random access memory devices or a dynamic random access memory devices), magnetic storage media (including, for example, an analog or digital magnetic tape or a hard disk drive), and optical storage media (including, for example, a CD, a DVD, or a Blu-ray Disc). Examples of the media with a built-in rewriteable non-volatile memory, include but are not limited to memory cards, and media with a built-in ROM, including but not limited to ROM cassettes, etc. Program instructions include both machine codes, such as produced by a compiler, and higher-level codes that may be executed by the computer using an interpreter. The described hardware devices may be configured to execute one or more software modules to perform the operations of the above-described example embodiments of the description, or vice versa.

Non-limiting examples of computing devices include a processor, a controller, an arithmetic logic unit (ALU), a digital signal processor, a microcomputer, a field programmable array (FPA), a programmable logic unit (PLU), a microprocessor or any device which may execute instructions and respond. A central processing unit may implement an operating system (OS) or one or more software applications running on the OS. Further, the processing unit may access, store, manipulate, process and generate data in response to the execution of software. It will be understood by those skilled in the art that although a single processing unit may be illustrated for convenience of understanding, the processing unit may include a plurality of processing elements and/or a plurality of types of processing elements. For example, the central processing unit may include a plurality of processors or one processor and one controller. Also, the processing unit may have a different processing configuration, such as a parallel processor.

The computer programs may also include or rely on stored data. The computer programs may encompass a basic input/output system (BIOS) that interacts with the hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Figure 6:
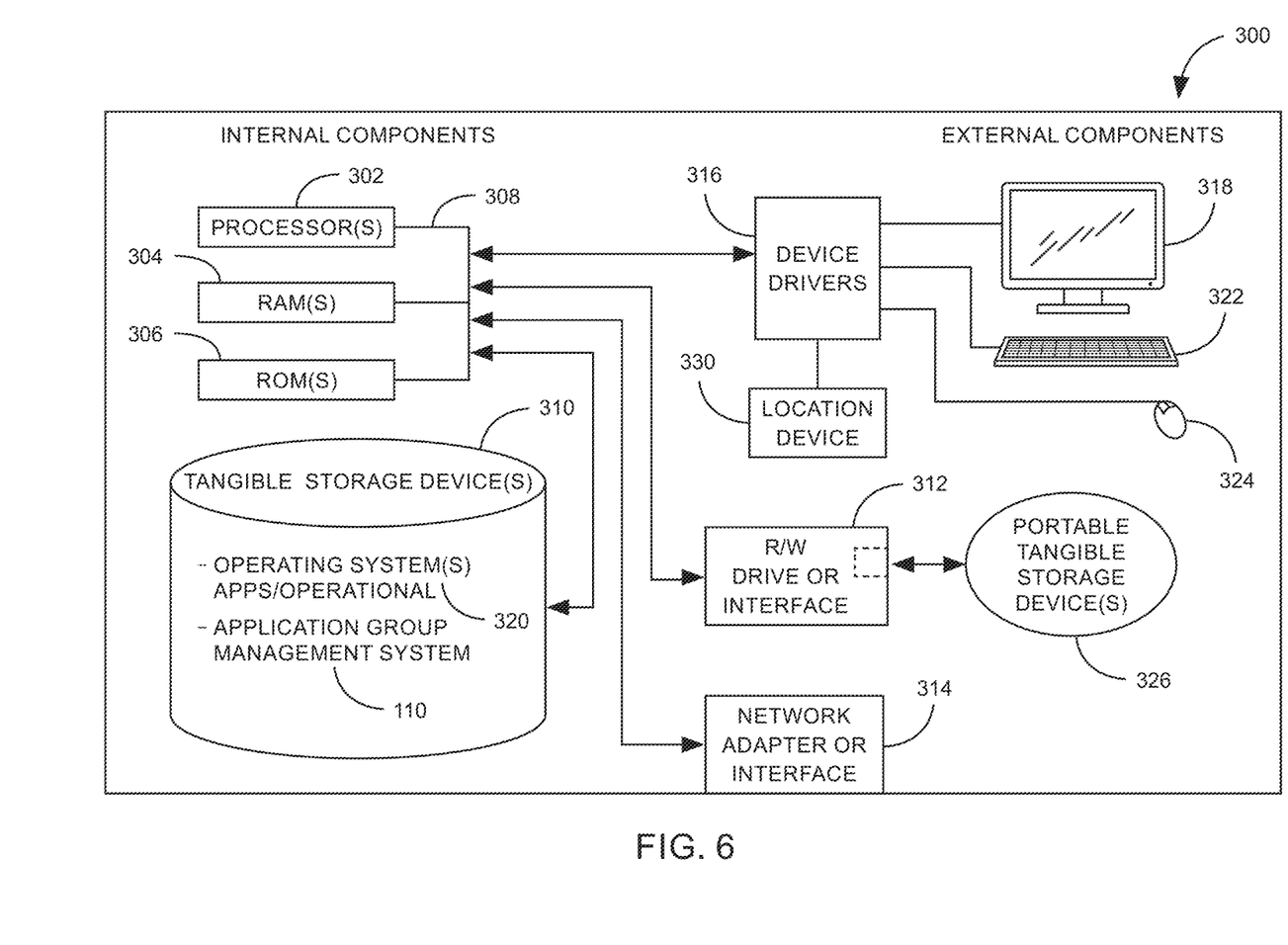
FIG. 6 is a block diagram illustrating an example computer system, according to some aspects of the present description.

One example of a computing system 300 is described below in FIG. 6. The computing system 300 includes one or more processor 302, one or more computer-readable RAMs 304 and one or more computer-readable ROMs 306 on one or more buses 308. Further, the computer system 308 includes a tangible storage device 310 that may be used to execute operating systems 320 and the application group management system 100. Both, the operating system 320 and application group management system 100 are executed by processor 302 via one or more respective RAMs 304 (which typically includes cache memory). The execution of the operating system 320 and/or the application group management system 100 by the processor 302, configures the processor 302 as a special-purpose processor configured to carry out the functionalities of the operating system 320 and/or the application group management system 100, as described above.

Examples of storage devices 310 include semiconductor storage devices such as ROM 506, EPROM, flash memory or any other computer-readable tangible storage device that may store a computer program and digital information.

Computer system 300 also includes a R/W drive or interface 312 to read from and write to one or more portable computer-readable tangible storage devices 326 such as a CD-ROM, DVD, memory stick or semiconductor storage device. Further, network adapters or interfaces 314 such as a TCP/IP adapter cards, wireless Wi-Fi interface cards, or 3G or 4G wireless interface cards or other wired or wireless communication links are also included in the computer system 300.

In one example embodiment, the application group management system 100 may be stored in tangible storage device 310 and may be downloaded from an external computer via a network (for example, the Internet, a local area network or another wide area network) and network adapter or interface 314.

Computer system 300 further includes device drivers 316 to interface with input and output devices. The input and output devices may include a computer display monitor 318, a keyboard 322, a keypad, a touch screen, a computer mouse 324, and/or some other suitable input device.

In this description, including the definitions mentioned earlier, the term 'module' may be replaced with the term 'circuit.' The term 'module' may refer to, be part of, or include processor hardware (shared, dedicated, or group) that executes code and memory hardware (shared, dedicated, or group) that stores code executed by the processor hardware. The term code, as used above, may include software, firmware, and/or microcode, and may refer to programs, routines, functions, classes, data structures, and/or objects.

Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above. Shared memory hardware encompasses a single memory device that stores some or all code from multiple modules. Group memory hardware encompasses a memory device that, in combination with other memory devices, stores some or all code from one or more modules.

In some embodiments, the module may include one or more interface circuits. In some examples, the interface circuits may include wired or wireless interfaces that are connected to a local area network (LAN), the Internet, a wide area network (WAN), or combinations thereof. The functionality of any given module of the present description may be distributed among multiple modules that are connected via interface circuits. For example, multiple modules may allow load balancing. In a further example, a server (also known as remote, or cloud) module may accomplish some functionality on behalf of a client module.

While only certain features of several embodiments have been illustrated and described herein, many modifications and changes will occur to those skilled in the art. It is, therefore, to be understood that the appended claims are intended to cover all such modifications and changes as fall within the scope of the invention and the appended claims.

The invention claimed is:

1. A system for context-aware application group management in a container deployment environment, the system comprising:
 a memory storing one or more processor-executable routines; and
 a processor communicatively coupled to the memory, the processor configured to execute the one or more processor-executable routines to:
 receive an instance identifier (ID) corresponding to an application group based on a re-registration request for the application group by the user;
 identify an instance corresponding to the instance ID from an instance database and a context based on the instance from a context database;
 generate a re-registration token comprising a context ID corresponding to the context; and
 initiate a re-registration workflow to create a new instance of the application group based on the re-registration token and the context ID,
 wherein:
 the instance ID corresponds to an instance of the application group that was registered earlier and is currently de-registered or to an instance of the application group that is currently registered;
 the re-registration request corresponds to re-registration of the application group that is currently de-registered; and
 the processor is further configured to execute the one or more processor-executable routines to verify that a context with the context ID exists and verify that the context isn't associated with an active instance before generating the re-registration token.

2. The system of claim 1, wherein the re-registration request corresponds to a cloning request for the application group that is currently registered or de-registered.

3. The system of claim 2, wherein the processor is further configured to execute the one or more processor-executable routines to:
 allocate a new context ID corresponding to the application group based on the cloning request for the application group by the user;
 create a copy of the original context with the new context ID and user info corresponding to the new context ID; and
 create copies of all original backups of the original context ID and link them with the new context ID.

4. The system of claim 3, wherein the processor is further configured to execute the one or more processor-executable routines to create one or more references to one or more resources associated with the original backups or replicate one or more resources associated with the original backups.

5. The system of claim 1, wherein the processor is further configured to execute the one or more processor-executable routines to verify ownership of the application group based on a user info of the user and one or more user info corresponding to the context across one or more instances before generating the re-registration token.

6. The system of claim 1, wherein the container deployment environment is a Kubernetes environment.

7. The system of claim 1, wherein the system is configured to generate, preserve, and track a context of the application group across instances of the application group in different environments and clusters.

8. A method for context-aware application group management in a container deployment environment, the method comprising:
 receiving an instance identifier (ID) corresponding to an application group based on a re-registration request for the application group by the user;

identifying an instance corresponding to the instance ID from an instance database, and a context-based on the instance from a context database;

generating a re-registration token comprising a context ID corresponding to the context; and initiating a re-registration workflow to create a new instance of the application group based on the re-registration token and the context ID;

wherein:

the instance ID corresponds to an instance of the application group that was registered earlier and is currently de-registered or to an instance of the application group that is currently registered;

the re-registration request corresponds to re-registration of the application group that is currently de-registered; and the processor is further configured to execute the one or more processor-executable routines to verify that a context with the context ID exists and verify that the context isn't associated with an active instance before generating the re-registration token.

9. The method of claim 8, wherein the re-registration request corresponds to a cloning request for the application group that is currently registered or de-registered.

10. The method of claim 9, further comprising:

allocating a new context ID corresponding to the application group based on the cloning request for the application group by the user;

creating a copy of the original context with the new context ID and user info corresponding to the new context ID; and creating copies of all backups of the original context ID and linking them with the new context ID.

11. The method of claim 10, further comprising creating one or more references to one or more resources associated with the original backups or replicating one or more resources associated with the original backups.

12. The method of claim 8, further comprising verifying ownership of the application group based on a user info of the user and one or more user info corresponding to the context across one or more instances before generating the re-registration token.

13. The method of claim 8, wherein the container deployment environment is a Kubernetes environment.

14. The method of claim 8, wherein the method comprises generating, preserving, and tracking a context of the application group across instances of the application group in different environments and clusters.

* * * * *